United States Patent

Michalko

(10) Patent No.: US 7,400,065 B2
(45) Date of Patent: Jul. 15, 2008

(54) ELECTRICAL POWER DISTRIBUTION SYSTEM AND METHOD WITH ACTIVE LOAD CONTROL

(75) Inventor: Rodney G. Michalko, Queensville (CA)

(73) Assignee: Honeywell International Inc., Morristown, NJ (US)

( * ) Notice: Subject to any disclaimer, the term of this patent is extended or adjusted under 35 U.S.C. 154(b) by 175 days.

(21) Appl. No.: 11/199,151

(22) Filed: Aug. 9, 2005

(65) Prior Publication Data

US 2006/0056124 A1   Mar. 16, 2006

Related U.S. Application Data

(60) Provisional application No. 60/603,568, filed on Aug. 24, 2004.

(51) Int. Cl.
   *H02J 1/10* (2006.01)
   *H02J 3/38* (2006.01)
   *H02J 7/34* (2006.01)
(52) U.S. Cl. ................................ 307/44; 307/84
(58) Field of Classification Search .............. 307/44, 307/18, 32, 84
   See application file for complete search history.

(56) References Cited

U.S. PATENT DOCUMENTS

| | | | |
|---|---|---|---|
| 4,403,292 A | 9/1983 | Ejzak et al. | 364/92 |
| 5,077,485 A | 12/1991 | Rashid | 307/84 |
| 5,764,502 A | 6/1998 | Morgan et al. | 363/65 |

| | | | |
|---|---|---|---|
| 2004/0119454 A1 | 6/2004 | Chang et al. | |

(Continued)

FOREIGN PATENT DOCUMENTS

EP   1 099 630 A2   5/2001

(Continued)

OTHER PUBLICATIONS

"Conceptual Design of an Advanced Aircraft Electrical System (AAES)"; William R. Owens, et al.; Proceedings of the National Aerospace and Electronics Conference, Dayton, Ohio, May 18-22, 1987, New York, IEEE, US, vol. 2, pp. 441-455.

(Continued)

*Primary Examiner*—Michael J Sherry
*Assistant Examiner*—Carlos Amaya
(74) *Attorney, Agent, or Firm*—Oral Caglar, Esq.

(57) ABSTRACT

An electrical power distribution system is provided. The electrical power distribution system includes: a first AC power source (1a); a second AC power source (1b); a first DC bus (6a); a first AC to DC rectifier (5a); a second AC to DC rectifier (5b); and an electrical load management control unit (8). The first AC power source (1a) is connected to the first DC bus (6a) via the first AC to DC rectifier (5a). The second AC power source (1b) is connected to the first DC bus (6a) via the second AC to DC rectifier (5b). The electrical load management control unit (8) shifts power extraction between the first and second AC power sources (1a,1b) by changing an AC voltage output of one of the first and second AC power sources (1a, 1b) relative to an AC voltage output of the other of the first and second AC power sources (1a, 1b), thereby changing an DC voltage output to the first DC bus (6a) from one of the first and second AC to DC rectifiers (5a, 5b).

12 Claims, 5 Drawing Sheets

U.S. PATENT DOCUMENTS

2004/0129835 A1  7/2004  Atkey et al.

FOREIGN PATENT DOCUMENTS

EP      1 107 437 A2   6/2001

OTHER PUBLICATIONS

"The Automatic Control of Marine Alternator Sets"; R. A. Fuller; Shipping World and Shipbuilder, Feb. 1968, London, England, vol. 161, No. 3817, pp. 394-396.

Advanced Electrical System (AES); Franz L. Worth, et al.; May 21, 1990; IEEE 1990; pp. 400-403.

ELECTRICAL POWER DISTRIBUTION SYSTEM AND METHOD WITH ACTIVE LOAD CONTROL

CROSS-REFERENCE TO RELATED APPLICATIONS

The present application claims priority under 35 U.S.C. §119(e) of provisional patent application No. 60/603,568 filed Aug. 24, 2004, which is hereby incorporated by reference in its entirety.

FIELD OF THE INVENTION

The present invention relates to an electrical power distribution system and method, and more particularly, to an electrical power distribution system and method which implement an electrical load sharing technique among a plurality of power sources.

BACKGROUND OF THE INVENTION

At present, multiple generator and prime mover (e.g., aircraft engine or auxiliary power unit (APU)) sizing methods typically require that the worst case electrical load power extraction requirements be satisfied by both the generators and the prime mover design. In the case of the generators, the total electrical load of the vehicle is summed up over all operational scenarios so as to represent the maximum rated capacity of the generators. For "More Electric" vehicle applications, which have been proposed to shift the primary power sources used for systems and services from pneumatic (engine bleed) and hydraulic sources to electric sources, this generator capacity can be so large that it poses a hardship for the prime mover to provide both the generator input horsepower as well as any other horsepower extraction (e.g., propulsion) tasks that it is required to perform over its operational envelope.

When sizing such prime movers, additional power output downsizing can be achieved in an effort to optimize program objectives (such as weight reduction), but usually at the expense of derating the output of the prime mover to various services under certain operational conditions (e.g., periods of multitasking, high temperature, low ambient air pressure). As a result, some or all of the prime movers typically must be increased in power extraction capacity or otherwise oversized to carry the load of the generators along with other accessories and provide the necessary propulsion. As a result, either or both of the prime movers and the generators must be oversized to ensure that electrical capacity is maintained and that the prime movers operate properly through their mission profile. This oversizing of the prime movers and the electrical system equipment drives up cost and weight for the prime mover and the electrical system and may hence present impediments to the vehicle program goals.

SUMMARY OF THE INVENTION

The present invention overcomes the aforementioned drawbacks by providing an electrical power distribution system which implements an electrical load sharing technique among a plurality of power sources.

According to one aspect of the present invention, an electrical power distribution system comprises: a first AC power source; a second AC power source; a first DC bus; a first AC to DC rectifier; a second AC to DC rectifier; and an electrical load management control unit. The first and second AC power sources are connected to the first DC bus via the first AC to DC rectifier and second AC to DC rectifier, respectively. The electrical load management control unit shifts an power extraction between the first and second AC power sources by changing an AC voltage output of one of the first and second AC power sources relative to an AC voltage output of the other of the first and second AC power sources, thereby changing an DC voltage output to the first DC bus from one of the first and second AC to DC rectifiers.

According to another aspect of the present invention, an electrical power distribution system comprises: a first AC power source; a second AC power source; a first DC bus; a first AC to DC rectifier; a second AC to DC rectifier; and an electrical load management control unit. The first and second AC power sources are connected to the first DC bus via the first AC to DC rectifier and second AC to DC rectifier, respectively. The electrical load management control unit shifts power extraction between the first and second AC power sources by adjusting either or both of a current flowing through the first AC to DC rectifier and a current flowing through the second AC to DC rectifier.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION

On a "More Electric" vehicle, the electrical system output can include a large portion of rectified DC power that is obtained through AC to DC power conversion units from power originally produced and supplied by the engine driven primary AC generators. When the proportion of rectified DC power is significant compared to the total generated AC power, sufficient leverage exists to use electric power flow blended from each generator as a means to share the total electrical load in different proportions from each generator. In this way, the horsepower extraction from each prime mover can be increased or decreased in proportion to the other prime movers. By ensuring that each installed generator capacity can carry the diverted loads and that the dissimilar engine performance specifications are mutually exclusive, shifting the horsepower extraction between prime movers can be accomplished without a reduction in electrical power output.

Figure 1:
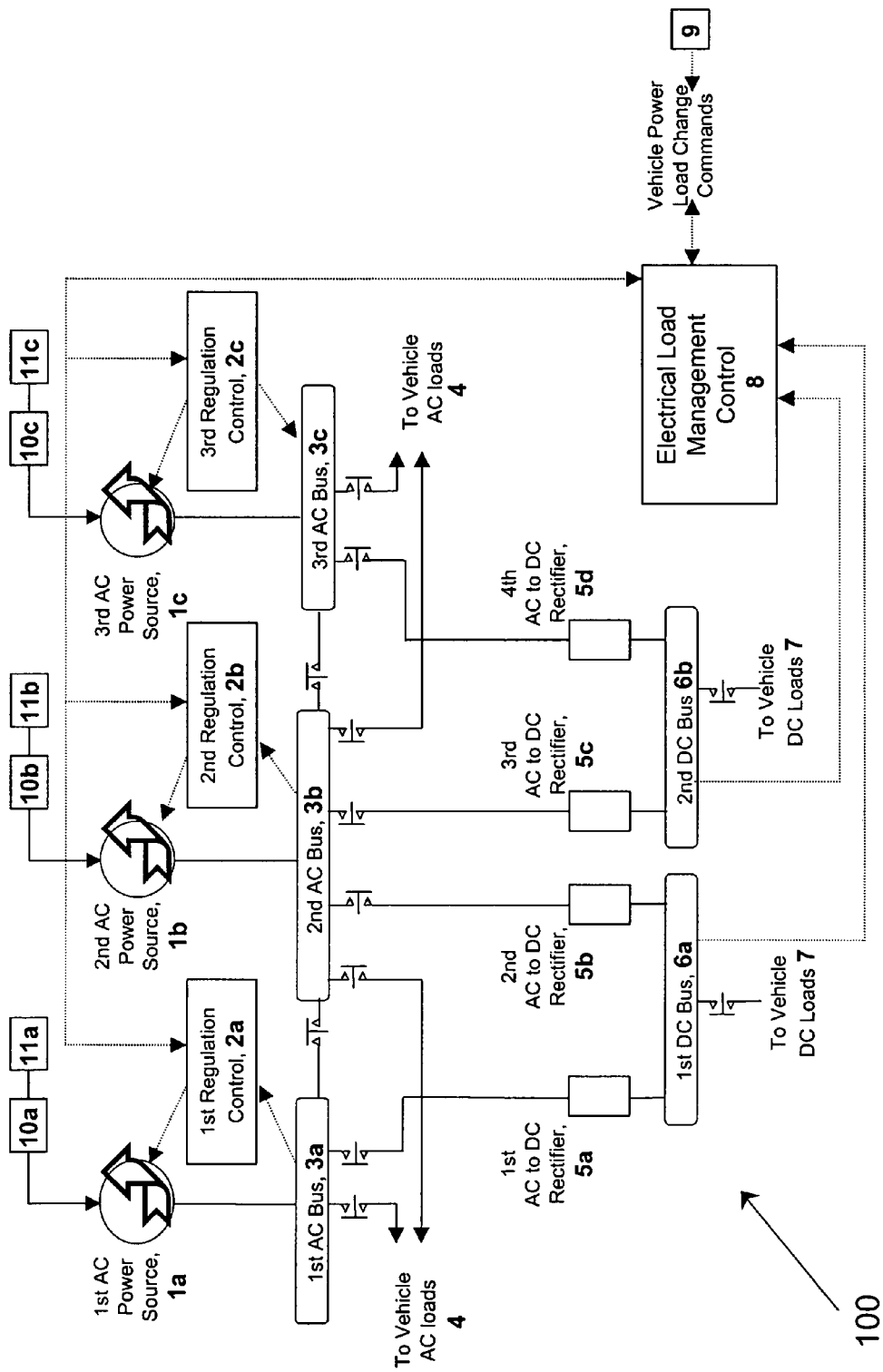
FIG. 1 is a schematic block diagram of an electrical power distribution system in accordance with an embodiment of the present invention.

FIG. 1 is a schematic block diagram of the electrical power distribution system in accordance with an embodiment of the present invention. The electrical power distribution system 100 includes a first AC power source 1a; a second AC power source 1b; and a third AC power source 1c.

In the illustrated embodiment, the first and third AC power sources 1a and 1c are a first AC generator 10a and a second AC generator 10c, respectively, and the first and second AC generators 10a and 10c are driven by a first aircraft engine 11a and a second aircraft engine 1c, respectively. The aircraft engine 11a or 11c can be, but not limited to, an aircraft propulsion engine, an aircraft turbine engine, an internal combustion engine (diesel, gasoline, propane, natural gas, etc.), or an steam powered engine, etc. In addition, the illustrated embodiment can also apply to any "more electric" land or sea vehicles which may use propulsion engines that are of limited size for the total electrical power extraction necessary for a more electric vehicle.

In the illustrated embodiment, the second AC power source 1b is a third AC generator 10b, and the third AC generator 10b is driven by an engine 11b, such as a third aircraft engine (e.g., an aircraft propulsion engine, an aircraft turbine engine, an internal combustion engine (diesel, gasoline, propane, natural gas, etc.), or an steam powered engine, etc.), an auxiliary power unit, a spool associated with one of the first and second aircraft engines 11a and 11c, etc. In this embodiment, the prime mover associated with the second AC power source 1b has performance characteristics which allow it to carry the electrical load when the first and second aircraft engines 10a and 10c associated with the first and third AC power sources 1a and 1c are unable to do so. It is also possible to allow some relief for power extraction of the second AC power source 1b.

The electrical power distribution system 100 further includes: a first DC bus 6a; a second DC bus 6b; a first AC to DC rectifier 5a; a second AC to DC rectifier 5b; a third AC to DC rectifier 5c; and a fourth AC to DC rectifier 5d. The first and second AC power sources 1a and 1b are connected to the first DC bus 6a via the first and second AC to DC rectifiers 5a and 5b, respectively. The second and third AC power sources 1b and 1c are connected to the second DC bus 6b via the third and fourth AC to DC rectifiers 5c and 5d, respectively.

The electrical power distribution system 100 further comprises an electrical load management control unit 8. In the illustrated embodiment, upon receiving the vehicle power load change commands from an engine control system (e.g., a computer) 9, the electrical load management control unit 8 shifts the power extraction between the first and second AC power sources 1a and 1b by changing an AC voltage output of one of the first and second AC power sources 1a and 1b relative to an AC voltage output of the other of the first and second AC power sources 1a and 1b, thereby changing an DC voltage output to the first DC bus 6a from one of the first and second AC to DC rectifiers 5a and 5b. The engine control system 9 is responsible for the engine output horsepower regulation and manages the vehicle status including the engine power setting, and the human operator controls (switches, rheostats, position transducers etc) that indicate changes to the electrical power loading which may be independent of computer monitored or generated signals. The vehicle power load change commands are any signals that may increase or decrease engine output power, increase or decrease electrical power demand, turn off or turn on electrical power sources or any relevant vehicle or environmental data that can have an influence on the complete engine power extraction control algorithm.

Similarly, upon receiving the vehicle power load change commands from the engine control system 9, the electrical load management control unit 8 shifts an power extraction between the second and third AC power sources 1b and 1c by changing an AC voltage output of one of the second and third AC power sources 1b and 1c relative to an AC voltage output of the other of the second and third AC power sources 1b and 1c, thereby changing an DC voltage output to the first DC bus 6a from one of the third and fourth AC to DC rectifiers 5c and 5d.

In the illustrated embodiment, the electrical power distribution system 100 further includes: a first regulation control unit 2a; a second regulation control unit 2b; and a third regulation control unit 2c. The first, second and third regulation control units 2a, 2b, and 2c are connected to the electrical load management control unit 8. The electrical load management control unit 8 regulates the AC voltage output of the first, second and third AC power sources 1a, 1b, and 1c via the first, second and third regulation control units 2a, 2b, and 2c, respectively.

In the illustrated embodiment, the electrical power distribution system 100 further includes: a first AC bus 3a; a second AC bus 3b; and a third AC bus 3C. The first, second and third AC buses 3a, 3b, and 3c are connected to the first, second and third AC power sources 1a, 1b, and 1c, respectively. The first, second and third AC buses 3a and 3b supply the AC voltage output from the first, second and third AC power sources 1a, 1b, and 1c to vehicle AC loads 4.

In addition, the first AC bus 3a supplies the AC voltage output from the first AC power source 1a to the first AC to DC rectifier 5a. The second AC bus supplies the AC voltage output from the second AC power source 1b to the second and third AC to DC rectifiers 5b and 5c. The third AC bus supplies the AC voltage output from the third AC power source 1c to the fourth AC to DC rectifier 5d.

In the illustrated embodiment, the first DC bus 6a supplies the DC voltage output from the first and second AC to DC rectifiers 5a and 5b to vehicle DC loads 7, and the second DC bus 6b supplies the DC voltage output from the third and fourth AC to DC rectifiers 5c and 5d to vehicle DC loads 7.

In the illustrated embodiment, the electrical load management control unit 8 acquires the DC voltage output of the first and second DC buses 6a and 6b to regulate the AC voltage output of the first, second and third AC power sources 1a, 1b and 1c.

In order to provide a closed loop control, the electrical load management control unit 8 monitors the output of the DC buses to ensure that the voltage on a specific DC bus is within acceptable limits for the DC equipment attached. In the case that the rectifiers are passive, for a constant input AC voltage, the DC output voltage will reduce as a function of output current. If the electrical load management control unit 8 was operating in an open loop and was changing the regulation control of the AC power sources, it could be done through a succession of regulation adjustments and DC load variations to lower each AC source alternately such that the rectifier DC output fell above or below the acceptable DC limits. In a closed loop, the electrical load management control unit 8 would know whether to trim up or down each AC Power Sources, thereby ensuring that the DC output is within acceptable limits.

Figure 2:
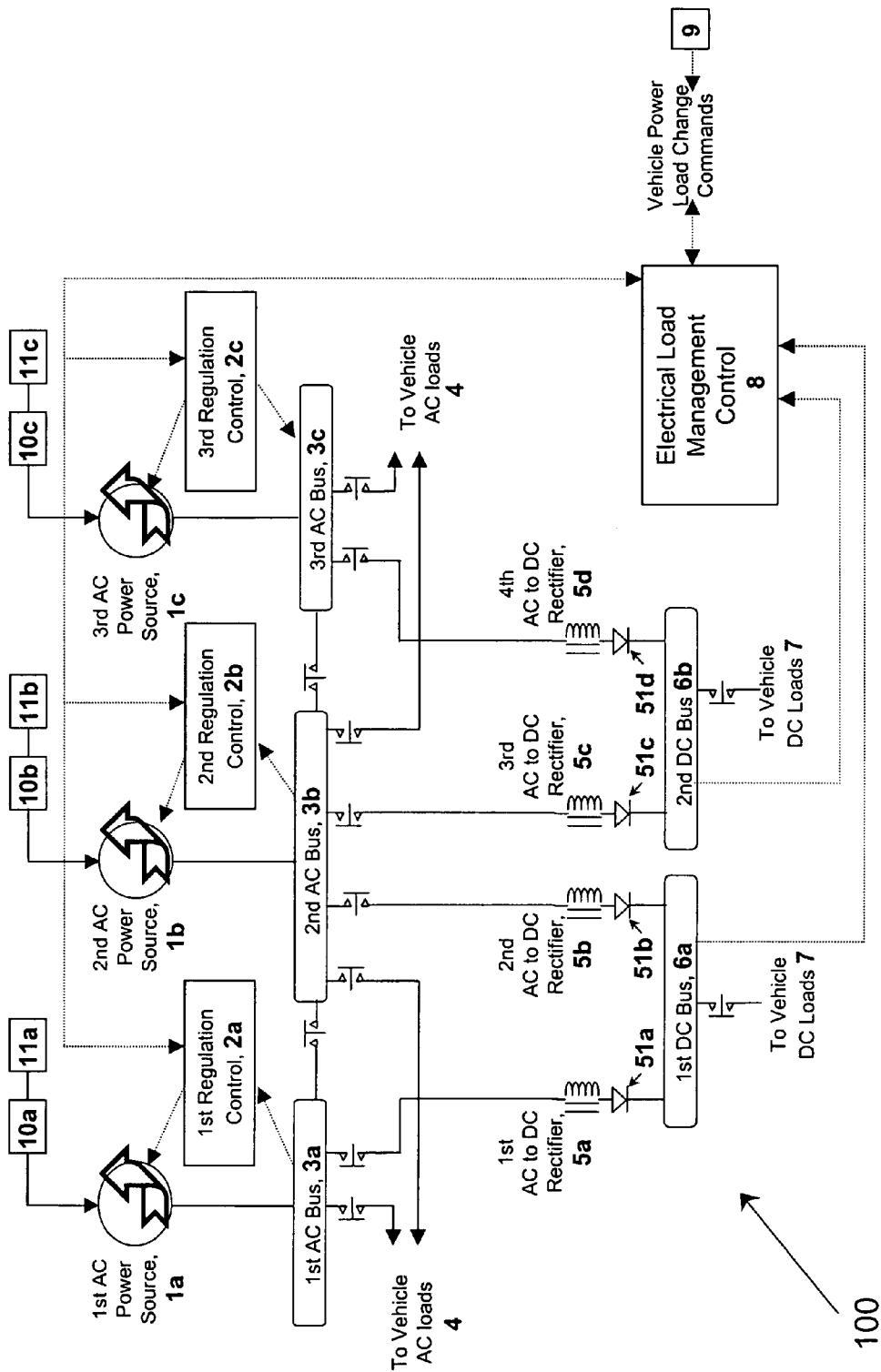
FIG. 2 is a schematic block diagram of an electrical power distribution system in accordance with another embodiment of the present invention.

In another embodiment shown in FIG. 2, each of the first and second AC to DC rectifiers 5a and 5b is a passive AC to DC rectifier. In this embodiment, each includes of the first and second AC to DC rectifiers 5a and 5b a diode 51a or 51b connected to the first DC bus 6a, as shown in FIG. 2. By changing the AC voltage output of the one of the first and second AC power sources 1a and 1b relative to the AC voltage output of the other of the first and second AC power sources 1a and 1b, a reverse bias on the diode of one of the first and second AC to DC rectifiers 5a and 5b, i.e., diode 51a or 51b, will restrict the DC voltage output to the first DC bus 6*a* from the one of the first and second AC to DC rectifiers 5*a* and 5*b*.

Similarly, in the embodiment shown in FIG. 2, each of the third and fourth AC to DC rectifiers 5*c* and 5*d* is a passive rectifier. In this embodiment, each of the third and fourth AC to DC rectifiers 5*c* and 5*d* includes a diode 51*c* or 51*d* connected to the second DC bus 6*b*, as shown in FIG. 2. By changing the AC voltage output of the one of the second and third AC power sources 1*b* and 1*c* relative to the AC voltage output of the other of the second and third AC power sources 1*b* and 1*c*, a reverse bias on the diode of one of the third and fourth AC to DC rectifiers 5*c* and 5*d*, i.e., diode 51*c* or 51*d*, will restrict the DC voltage output to the second DC bus 6*b* from the one of the third and fourth AC to DC rectifiers 5*c* and 5*d*.

For example, assuming that upon receiving the vehicle power load change commands from the engine control system 9, the electrical load management control unit 8 decides to offload the first AC Power Source, the electrical load management control unit 8 instructs the first regulation control unit 2*a* to reduce its regulated AC voltage output relative to the regulated AC voltage output of the second regulation control unit 2*b*. In this embodiment, since the first AC to DC rectifier 5*a* is a passive device, the output DC voltage of the first AC to DC rectifier 5*a* will decrease. On the other hand, since the second AC power source 1*b* still keeps outputting the same AC voltage, the DC voltage outputted by the second AC to DC rectifier 5*b* would be relatively higher than the DC voltage outputted by the first AC to DC rectifier 5*a*. This will causes a reverse bias on the diode 51*a* of the first AC to DC rectifier 5*a*, which restricts the DC voltage outputted from the first AC to DC rectifier 5*a* to the first DC Bus 6*a*.

Therefore, by controlling the AC power sources to increase or decrease the AC voltage output, the voltage change at the DC output of the corresponding AC to DC rectifier will generate a reverse bias on a specific diode of an AC to DC rectifier. Accordingly, electrical power flow and horsepower extraction from the corresponding AC power source can be reduced or discontinued.

Figure 3:
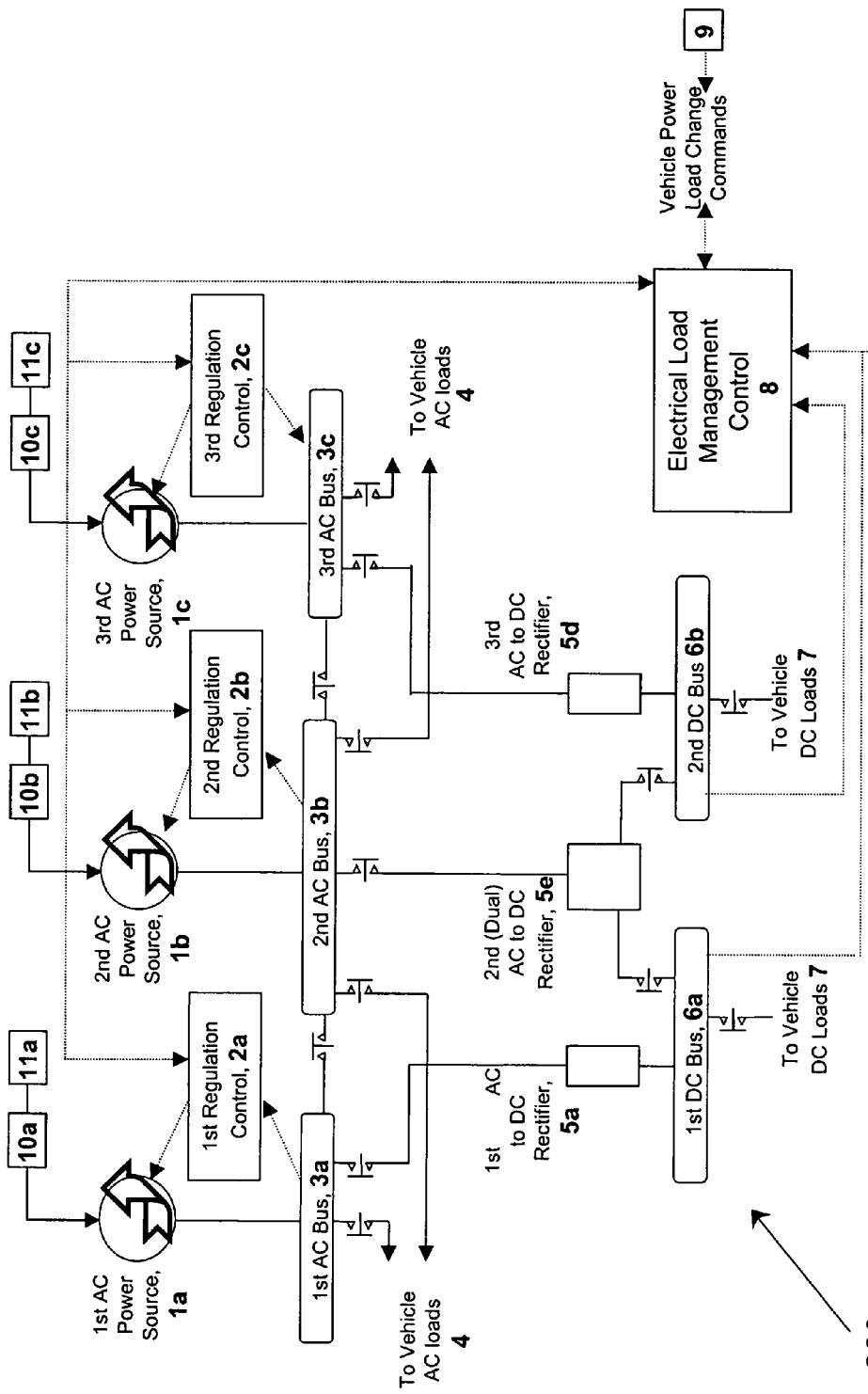
FIG. 3 is a schematic block diagram of an electrical power distribution system in accordance with another embodiment of the present invention.

FIG. 3 is a schematic block diagram of the electrical power distribution system in accordance with another embodiment of the present invention.

Figure 4:
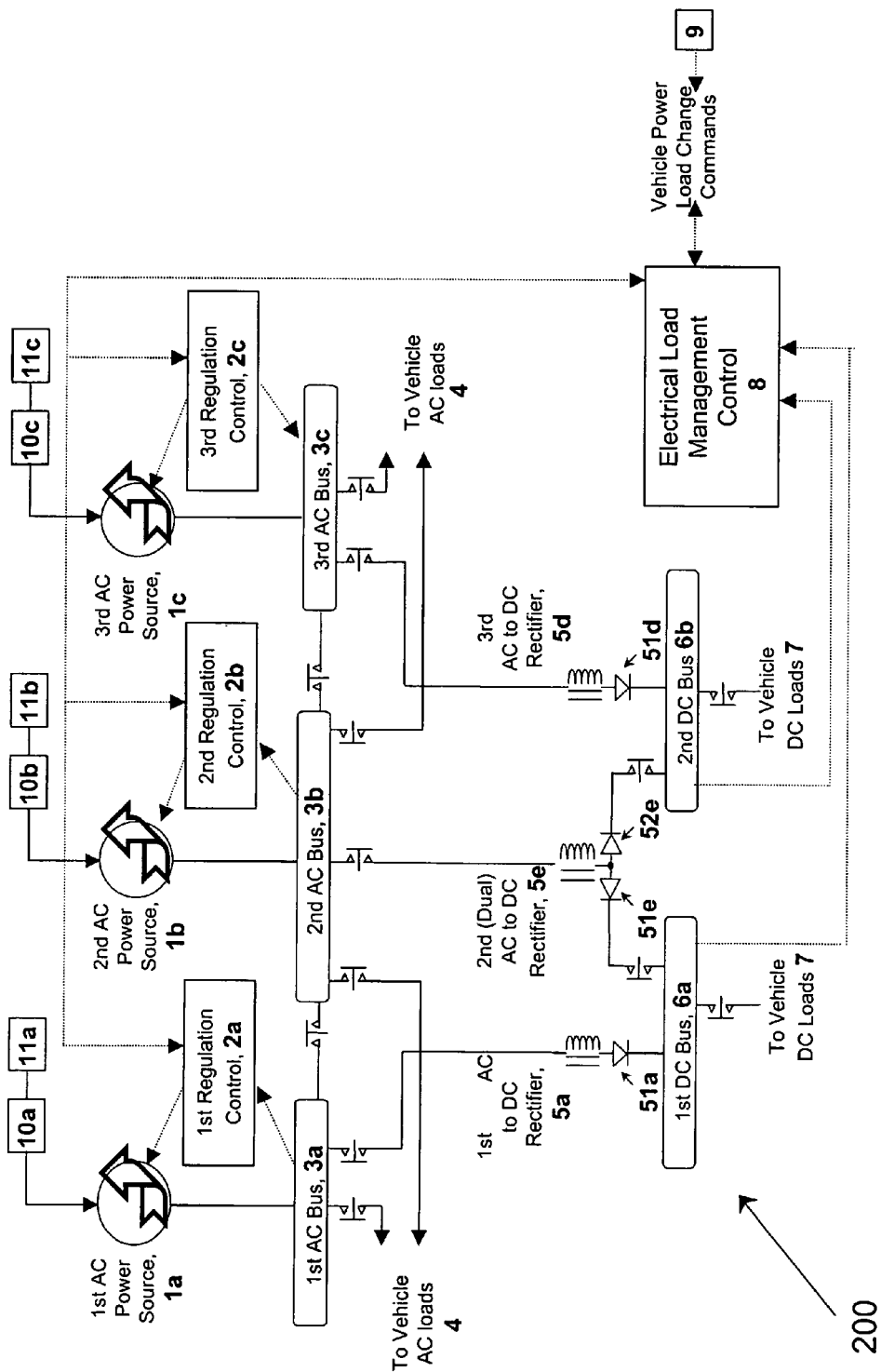
FIG. 4 is a schematic block diagram of an electrical power distribution system in accordance with another embodiment of the present invention.

The embodiment shown in FIG. 3 presents a variation of the embodiment shown in FIG. 1. In this embodiment shown in FIG. 3, to reduce the parts count, the two AC to DC rectifiers of the embodiment shown in FIG. 1 connected to the second AC power source 1*b* are replaced by a dual output AC to DC rectifier 5*e* in the electrical power distribution system 200. In another embodiment as shown in FIG. 4, the dual output AC to DC rectifier 5*e* is a passive rectifier and includes a first diode 51*e* connected to the first DC bus 6*a* and a second diode 52*e* connected to the second DC bus 6*b*. By changing the AC voltage output of the one of the first and second AC power sources 1*a* and 1*b* relative to the AC voltage output of the other of the first and second AC power sources 1*a* and 1*b*, a reverse bias on one of the first diode 51*e* of the second AC to DC rectifier 5*e* and the diode 51*a* of the first AC to DC rectifier 5*a* will restrict the DC voltage output to the first DC bus 6*a* from the one of the first and second AC to DC rectifiers 5*a* and 5*e*. Similarly, by changing the AC voltage output of the one of the second and third AC power sources 1*b* and 1*c* relative to the AC voltage output of the other of the second and third AC power sources 1*b* and 1*c*, a reverse bias on one of the second diode 52*e* of the second AC to DC rectifier 5*e* and the diode 51*d* of the third AC to DC rectifier 5*d* will restrict the DC voltage output to the second DC bus 6*b* from the one of the second and third AC to DC rectifiers 5*e* and 5*d*.

Therefore, by controlling the AC power sources to increase or decrease the AC voltage output, the voltage change at the DC output of the corresponding AC to DC rectifier will generate a reverse bias on a specific diode of an AC to DC rectifier. Accordingly, electrical power flow and horsepower extraction from the corresponding AC power source can be reduced or discontinued.

Another application of the concepts described above is to use an active rectifier in place of the passive AC to DC rectifier. In this embodiment, the active rectifier can directly affect the degree of power flow through itself and minimize the amount of AC Power Source voltage change necessary or eliminate it entirely.

Figure 5:
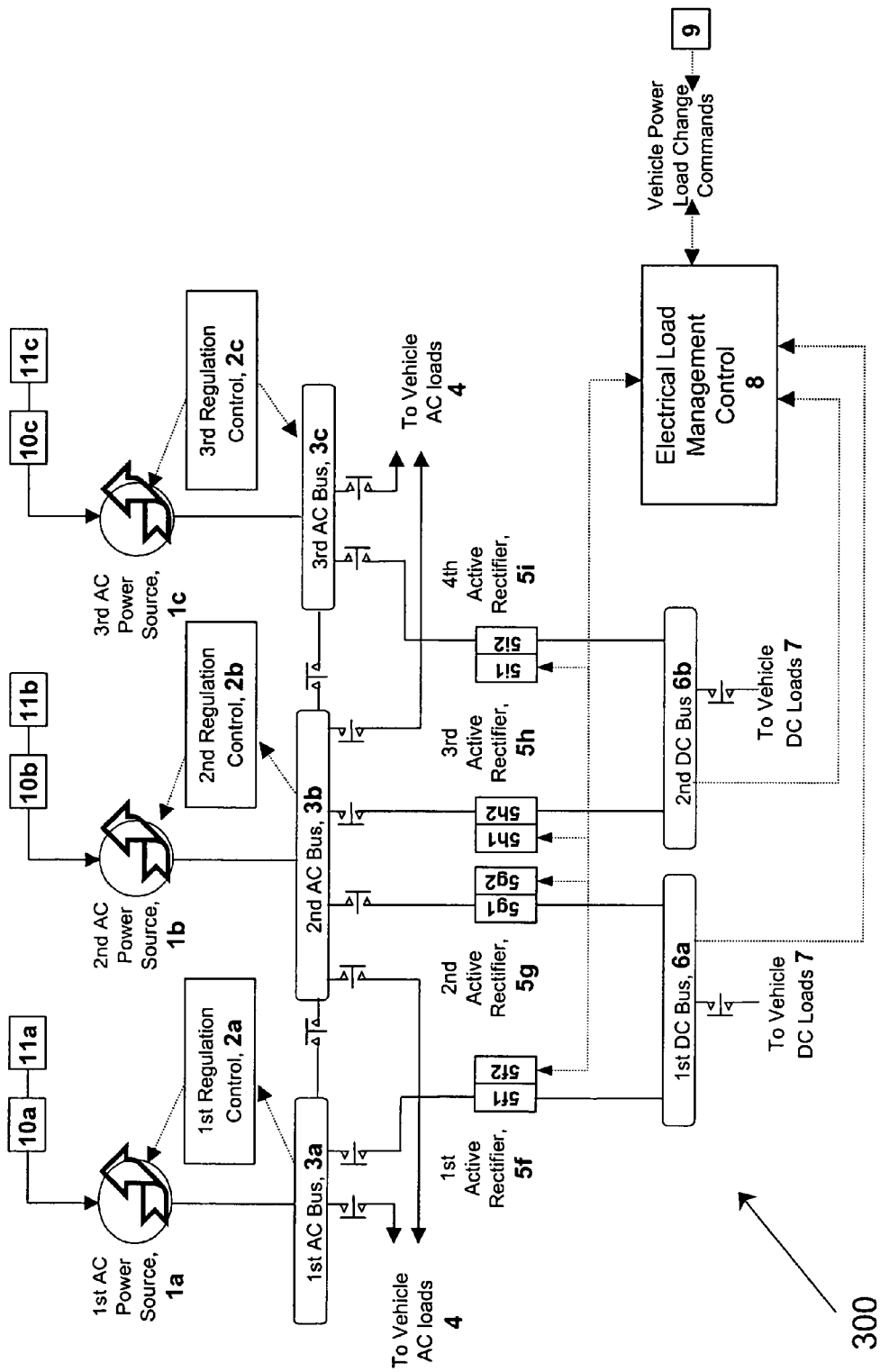
FIG. 5 is a schematic block diagram of an electrical power distribution system in accordance with another embodiment of the present invention.

The embodiment in FIG. 5 provides a more sophisticated method of achieving the same end with more dedicated and accurate power blending control. The active rectifiers 5*f*, 5*g*, 5*h* and 5*i* are shown in one possible configuration in FIG. 5 that combines a power section that provides the power switching circuits and devices (5*f*1, 5*g*1, 5*h*1, 5*i*1) and switching device driver control electronics, regulation and protection logic (5*f*2, 5*g*2, 5*h*2, 5*i*2). In other possible configurations, the power section and the control section may be realized as separate units communicating through data buses or discrete connections. In another more integrated solution, the electronic controls of the active rectifier may be incorporated in the electrical load management control unit with the switching device driver outputs connected only to the power section. Either architecture described or other physical arrangements of controls that can be envisioned do not change the fundamental controls or the intention of power blending scheme described. In such a scheme the electrical load management control unit 8 does not modify the regulation control unit for each AC generation source as in FIGS. 1-4. Previously this was required since the AC to DC rectifier was passive and the only opportunity to vary the current flow was to effect the regulation of the upstream generator regulation control. However, with the active rectifier, control electronics already exist as part of the active rectifier concept such that the electrical load management unit 8 can maintain a direct connection to the current and voltage regulation controls of each active rectifier. In monitoring the voltage and current from each active rectifier as well as the electrical power system and engine status of the aircraft, the electrical load management control unit 8 can adjust the flow of current through each active rectifier individually or in combination to obtain the desired engine power extraction and electrical power supply. Functionally, an active rectifier is more efficient because instead of reverse biasing the passive rectifiers by varying the AC source output voltage to switch off a particular input AC channel, and then performing two power conversion stages, the active rectifier uses switching semiconductors to synthesize (chop) and filter the input AC power signal to provide a constant DC output voltage. This results in a higher efficiency (less weight, volume and heat generation) since the power required at any time only passes through one conversion operation instead of being subjected to individual transformer and rectification stages. Simplicity is also introduced by allowing the generator regulation control units to maintain a constant voltage output for the general aircraft buses. Speed of response is also improved since the generators and transformers of the AC to DC rectifier naturally exhibit electromagnetic inertia in response to a regulation control input change and therefore, by affecting the active rectifier directly, this inertia can be minimized. The electrical load management control unit 8 therefore would directly vary the degree of DC power synthesis within the active rectifier to regulate the amount of power that would flow through any particular rectifier. Hence, this would result in the restricting or passing of electrical power in the appropriate proportion to the other rectifiers with respect to the permissible engine power extraction and the electrical power demand as determined by the electrical load management control unit. Therefore the desired blending effect as principally described by this patent earlier using passive rectifiers is similarly achieved using an active rectifier approach.

Although FIGS. 1-5 illustrate a plurality of discrete elements for the electrical load management control unit and the multiple regulation control units, it should be recognized that this illustration is for ease of explanation and the associated control functions can be combined in one or more elements, including by implementing software, hardware, ASIC, etc., based techniques.

What is claimed is:

1. An electrical power distribution system, comprising:
   a first AC power source;
   a second AC power source;
   a first DC bus;
   a first AC to DC rectifier, the first AC power source being connected to the first DC bus via the first AC to DC rectifier
   a second AC to DC rectifier, the second AC power source being connected to the first DC bus via the second AC to DC rectifier;
   an electrical load management control unit, the electrical load management control unit partially shifting power extraction between the first and second AC power sources by changing an AC voltage output of one of the first and second AC power sources relative to an AC voltage output of the other of the first and second AC power sources, to blend electric power from the first and second AC power sources, thereby dynamically changing a DC voltage output to the first DC bus from one of the first and second AC to DC rectifiers;
   a third AC power source;
   a second DC bus, the second AC power source being connected to the second DC bus via the second AC to DC rectifier;
   a third AC to DC rectifier, the third AC power source being connected to the second DC bus via the third AC to DC rectifier; and
   the electrical load management control unit shifting power extraction between the second and third AC power sources by changing an AC voltage output of one of the second and third AC power sources relative to an AC voltage output of the other of the second and third AC power sources, thereby changing a DC voltage output to the first DC bus from one of the second and third AC to DC rectifiers.

2. The electrical power distribution system of claim 1, wherein each of the first and second AC to DC rectifiers includes a diode connected to the first DC bus, wherein by changing the AC voltage output of the one of the first and second AC power sources relative to the AC voltage output of the other of the first and second AC power sources, a reverse bias on the diode of one of the first and second AC to DC rectifiers restricts the DC voltage output to the first DC bus from the one of the first and second AC to DC rectifiers.

3. The electrical power distribution system of claim 1, further comprising:
   the second AC power source being connected to the second DC bus via the third AC to DC rectifier;
   a fourth AC to DC rectifier, the third AC power source being connected to the second DC bus via the fourth AC to DC rectifier; and
   the electrical load management control unit shifting power extraction between the second and third AC power sources by changing an AC voltage output of one of the second and third AC power sources relative to an AC voltage output of the other of the second and third AC power sources, thereby changing a DC voltage output to the first DC bus from one of the third and fourth AC to DC rectifiers.

4. The electrical power distribution system of claim 3, wherein each of the third and fourth AC to DC rectifiers includes a diode connected to the second DC bus, wherein by changing the AC voltage output of the one of the second and third AC power sources relative to the AC voltage output of the other of the second and third AC power sources, a reverse bias on the diode of one of the third and fourth AC to DC rectifiers restricts the DC voltage output to the second DC bus from the one of the third and fourth AC to DC rectifiers.

5. The electrical power distribution system of claim 3, further comprising:
   a first regulation control unit;
   a second regulation control unit; and
   a third regulation control unit, the first, second and third regulation control units being connected to the electrical load management control unit, the electrical load management control unit regulating the AC voltage output of the first, second and third AC power sources via the first, second and third regulation control units, respectively.

6. The electrical power distribution system of claim 3, further comprising:
   a first AC bus;
   a second AC bus; and
   a third AC bus, the first, second and third AC buses being connected to the first, second and third AC power sources, respectively, the first, second and third AC buses supplying the AC voltage output from the first, second and third AC power sources to vehicle AC loads, the first AC bus supplying the AC voltage output from the first AC power source to the first AC to DC rectifier, the second AC bus supplying the AC voltage output from the second AC power source to the second and third AC to DC rectifiers, and the third AC bus supplying the AC voltage output from the third AC power source to the fourth AC to DC rectifier.

7. The electrical power distribution system of claim 3, wherein the first DC bus supplies the DC voltage output from the first and second AC to DC rectifiers to vehicle DC loads, and the second DC bus supplies the DC voltage output from the third and fourth AC to DC rectifiers to vehicle DC loads.

8. The electrical power distribution system of claim 3, wherein the electrical load management control unit acquires the DC voltage output of the first and second DC buses to regulate the AC voltage output of the first, second and third AC power sources.

9. The electrical power distribution system of claim 3, wherein the first and third AC power sources are provided by a first AC generator and a second AC generator, respectively, and the second AC power source is provided by a third AC generator, the first and second AC generators being driven by a first aircraft engine and a second aircraft engine, respectively, the third AC generator being driven by one of a third aircraft engine, an auxiliary power unit, and a spool associated with one of the first and second aircraft engines.

10. The electrical power distribution system of claim 1, wherein the second AC to DC rectifier is a dual output AC to DC rectifier including a first diode connected to the first DC bus and a second diode connected to the second DC bus, and the first AC to DC rectifier includes a diode connected to the first DC bus, wherein by changing the AC voltage output of the one of the first and second AC power sources relative to the AC voltage output of the other of the first and second AC power sources, a reverse bias on one of the first diode of the second AC to DC rectifier and the diode of the first AC to DC rectifier restricts the DC voltage output to the first DC bus from the one of the first and second AC to DC rectifiers, and wherein by changing the AC voltage output of the one of the second and third AC power sources relative to the AC voltage output of the other of the second and third AC power sources, a reverse bias on one of the second diode of the second AC to DC rectifier and the diode of the third AC to DC rectifier restricts the DC voltage output to the second DC bus from the one of the second and third AC to DC rectifiers.

11. The electrical power distribution system of claim 1, further comprising:

a first AC bus;

a second AC bus; and a third AC bus, the first, second and third AC buses being connected to the first, second and third AC power sources, respectively, the first, second and third AC buses supplying the AC voltage output form the first, second and third AC power sources to vehicle AC loads, the first AC bus supplying the AC voltage output from the first AC power source to the first AC to DC rectifier, the second AC bus supplying the AC voltage output from the second AC power source to the second AC to DC rectifier, and the third AC bus supplying the AC voltage output from the third AC power source to the third AC to DC rectifier.

12. The electrical power distribution system of claim 1, wherein the first DC bus supplies the DC voltage output from the first and second AC to DC rectifiers to vehicle DC loads, and second DC bus supplies the DC voltage output from the second and third AC to DC rectifiers to vehicle DC loads.

* * * * *